United States Patent Office 3,454,542
Patented July 8, 1969

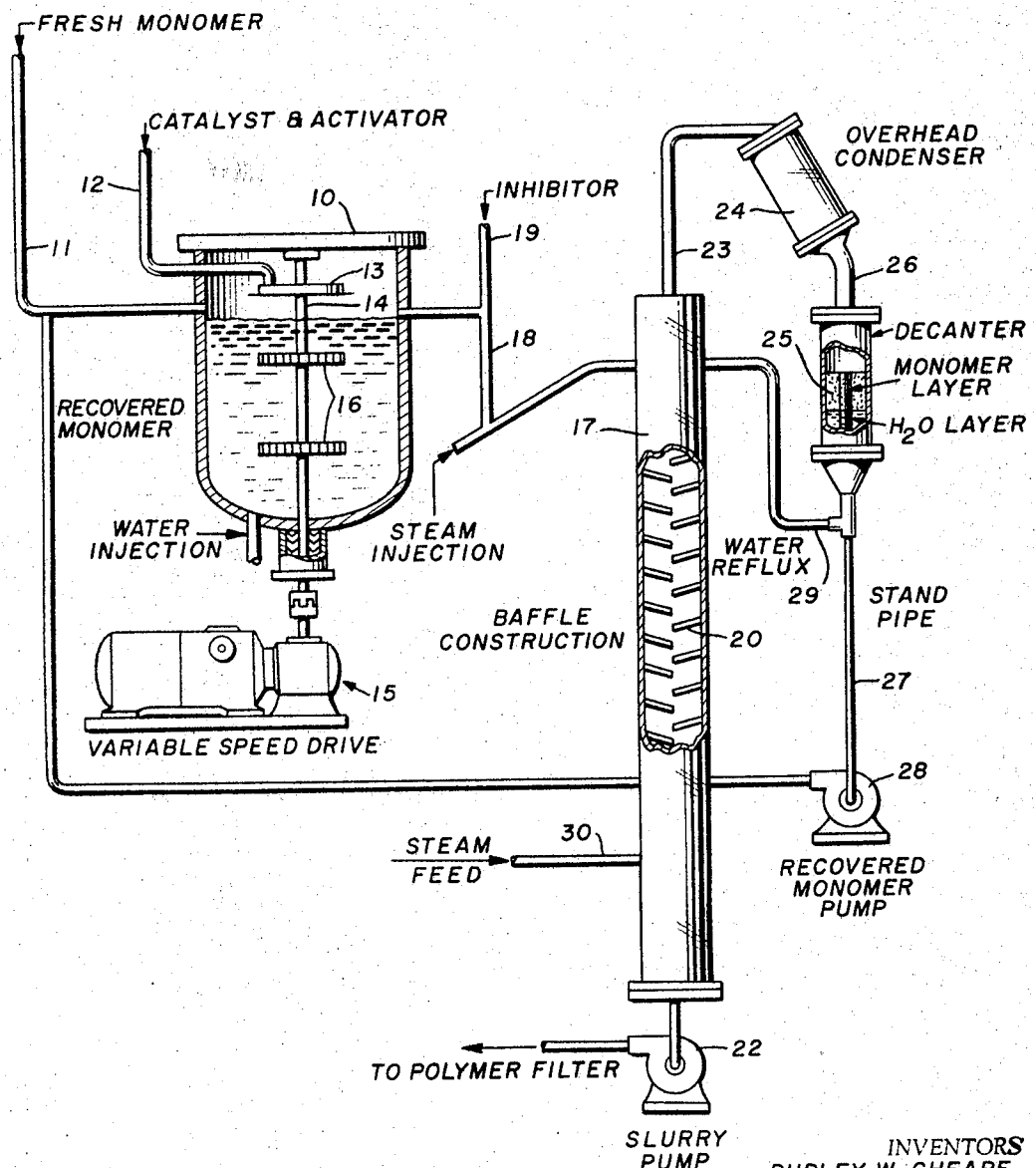

---

3,454,542
MONOMER RECOVERY PROCESS
Dudley W. Cheape, Jr., and Wayne R. Eberhardt, Decatur, Ala., assignors to Monsanto Company, St. Louis, Mo., a corporation of Delaware
Filed Aug. 24, 1964, Ser. No. 391,689
Int. Cl. C08f *1/62, 1/76*
U.S. Cl. 260—85.5                                7 Claims

ABSTRACT OF THE DISCLOSURE

This invention relates to reducing the amount of acrylonitrile monomer loss due to the formation of an acrylonitrile-bisulfite addition product. The unpolymerized acrylonitrile monomers may be recovered with minimum loss of monomer by steam stripping of a polymer slurry while the slurry is cascading down a column.

---

In the continuous polymerization of vinyl monomers, and particularly, the emulsion polymerization of acrylonitrile with one or more other vinyl monomers using a Redox catalyst system, the polymerization reaction is stopped by the addition of an inhibiting agent or shortstop after 60 to 90 percent of the monomer present has reacted in order to prevent the formation of excessive quantities of undesirable low molecular weight polymers. It is now the standard practice in the art to recover these unreacted monomers by distillation after first removing the polymer from the reaction slurry by filtration.

The filtrate consisting of the mother liquor from the reaction plus the wash water from the polymer filters contains considerable quantities of $SO_2$ which was originally added to the reaction as an activator, and which creates a problem during the monomer recovery operation for it continues to promote the polymerization of the monomers. In order to prevent polymerization of the monomer in the distillation column and related process equipment, the $SO_2$ is normally reacted with sodium bicarbonate to form sodium bisulfite and carbon dioxide, thereby raising the pH of the system from a little below four to about five. The disadvantage in this process is that while the increase in pH removes the sulfur dioxide activator it also gives rise to the formation of an acrylonitrile-bisulfite addition product. At pH values of less than 3.5, the formation of the acrylonitrile-bisulfite product is at a minimum; however, the rate of formation increases rapidly as the pH of the system is increased above 4.0. The acrylonitrile-bisulfite addition product which is stable, and does not decompose at normal monomer distillation temperatures, is discarded in the aqueous distillation column bottoms and results in substantial loss of the acrylonitrile monomer.

An object of this invention is to provide a method for reducing the acrylonitrile loss due to the formation of the acrylonitrile-bisulfite addition product by providing a continuous and effective method of recovering unreacted monomers from a low pH system.

Another object of this invention is to provide a method for removing unreacted monomers from a polymer slurry as the latter cascades down a stripping column.

A further object of this invention is to provide a method for reducing the pH and the time during which the acrylonitrile is in contact with sodium bisulfite.

More specific objects and advantages will be apparent to those skilled in the art from the following detailed description which illustrates and discloses but is not intended to limit the scope of this invention.

The disclosed process for reducing the amount of acrylonitrile loss due to the formation of the acrylonitrile-bisulfite addition product is unique and departs from the normal process in that the unreacted monomers are recovered directly from the polymerization reaction slurry while at a low pH rather than being distilled from an aqueous solution which is obtained after filtering the polymer product and washing the same. The reactor which polymerizes the various monomers is continuously charged with acrylonitrile, vinyl acetate, aqueous potassium persulfate solution which acts as a catalyst, aqueous sulfur dioxide solution which acts as an activator, and aqueous sodium bicarbonate solution which maintains the pH at about 3 while reacting with the sulfur dioxide to form carbon dioxide and sodium bisulfite. Acrylonitrile and vinyl acetate are added in proportion to 91 percent to 9 percent. The polymer resulting therefrom contains 93 percent acrylonitrile and 7 percent vinyl acetate. The acrylonitrile-vinyl acetate polymer along with the unreacted monomers and impurities in water overflows the reactor into a trap where optionally oxalic acid is added to shortstop the polymerization reaction. This slurry enters a V-shaped trap where steam is injected therein to preheat the slurry and to keep the polymer from plugging the line. The slurry then enters a baffle type stripping column at the top thereof and cascades to the bottom. Steam is fed into the lower portions of the column and rises counter-current to the falling slurry and strips the polymer slurry of the unreacted monomers as the slurry cascades down the column. The column overhead consisting of the monomer and water plus quantities of $SO_2$ and other volatile impurities travels to a condenser whereupon this gaseous mixture is condensed and forms an aqueous mixture. A decanter receives this aqueous mixture wherein the monomer and water separate into distinct layers with the latter being recycled back to the stripping column as reflux. A recovered monomer pump transfers the monomer from the decanter into the fresh monomer feed line. After mixing with fresh monomer, the weight proportions of which are predetermined to produce the desired concentrations of acrylonitrile and vinyl acetate in the combined monomer stream, the monomers are fed into the reactor to be polymerized. The polymer, water and salts are removed from the bottom of the stripping column and are transferred to a filter. The polymer is separated from the slurry and washed and the entire filtrate is sewered as waste.

Since the recovered monomers are recycled directly to the fresh monomer feed line and back to the polymerization reactor, it is not required to remove the $SO_2$ activator present in slurry feed to the column by the addition of sodium bicarbonate as is necessary in the process of the prior art. No polymerization of the recovered monomers occurs in the present invention, and the excess $SO_2$ recovered and recycled with the unreacted monomers allows the fresh $SO_2$ feed to the polymerization reaction to be substantially reduced thereby improving the economy of the process. The omission of the sodium bicarbonate addition and the resulting presence of sulfur dioxide throughout the recovery system results in a low pH of about 3.0 which is maintained throughout the system.

The addition of oxalic acid shortstop to halt the polymerization reaction is required in the process of the prior art because of the extended periods during which the unreacted monomers remain in contact with the reaction mixture before they are finally separated and recovered. If the shortstop were not added, the monomers would continue to polymerize in the hold tank and filtration system and produce substantial amounts of undesirable low molecular weight polymer chains. In the process of the present invention however, the slurry overflowing the reactor is fed directly to the stripping column where the unreacted monomers are removed from the reaction mixture. The polymerization of these monomers is thereby effectively terminated except for the slight amount of post polymerization occurring in the transfer line and within the stripping column. Normally this small amount of post polymerization presents no problems; however, it can be effectively reduced if desired by the use of a polymerization inhibitor such as oxalic acid or a salt of oxalic acid, such as, sodium oxalate.

The process of the invention will become apparent from the following description when read in conjunction with the drawing which illustrates diagrammatically an assembly of apparatus suitable for carrying out the process. In the following description, the process is described as applied to the recovery of unreacted monomers; however, it is apparent that the same process may be carried out for any similar stripping process.

In the drawing:

Reactor 10, which may be any suitable receptacle receives as continuous feeds a monomer mixture of 91 percent acrylonitrile, 9 percent vinyl acetate, an aqueous solution of potassium persulfate catalyst, an aqueous solution of a sulfur dioxide activator, and an aqueous solution of sodium bicarbonate. The monomers enter the receptacle through line 11 while the catalyst and the activator enter reactor 10 through line 12 and are fed onto a slinger plate 13 which is mounted on rotatable shaft 14. Slinger plate 13 distributes the catalyst and activator evenly over the surface level of the reaction mixture. Agitation was achieved by connecting to a variable speed power unit 15 which rotates a shaft 14, shaft 14 having mounted thereon as well as slinger plate 13 a plurality of turbine blades 16.

The reactor overflow slurry was fed near the top of column 17 through V-shaped line 18, V-shaped line 18 acts as a trap to prevent the reverse flow of steam and vapors from stripping column 17. Oxalic acid was fed into the V-shaped trap through line 19 and served as an inhibitor to stop the reaction among the monomer molecules. It is to be noted that any salt of oxalic acid or any other polymerization inhibitor may also be used to shortstop this polymerization reaction. At the vertex of the V-shaped tube 18, steam was ejected therein to keep the polymer from settling and plugging the line. The steam also served to preheat the slurry before entering column 17. As the slurry overflows the reactor through V-shaped tube 18, it cascades down the baffles 20 which are mounted in column 17 and simultaneously, the primary steam supply is introduced near the bottom of column 17 through line 30 whereupon it associates with the cascading droplets of slurry as it rises the length of column 17. By such a close association with the slurry, the steam is able to vaporize and remove from the slurry the unreacted monomers and the sulfur dioxide and other volatile impurities. The slurry is removed from column 17 by a slurry pump 22. During the operation of the stripping column 17, the steam rate was controlled to maintain a vaporbend temperature of 90° C. plus or minus 2° C.

The steam containing the mentioned impurities exits through line 23 which connects to an overhead condenser 24. After being converted from the vapor phase to a liquid phase by the condenser, this condensate is led to a decanter 25 by a connecting line 26. In the decanter, the monomer and the water separate into layers whereupon the monomer is transferred to the fresh monomer line 11 by stand pipe 27 and recovered monomer pump 28. The water in decanter 25 was recycled to column 17 through line 29 as reflux.

This process has substantially reduced the formation of the acrylonitrile bisulfite addition product. The following examples foreshow how this process has improved the art; however, these examples are not intended to limit it in any way. Unless otherwise noted, all percentages as expressed in the examples indicate percent by weight.

Example I

A reactor was continuously charged wherein the feed had a proportional relationship of 450 parts of water, 90 parts of acrylonitrile, 10 parts of vinyl acetate, 0.40 percent of potassium persulfate based on the weight of the monomer, 3.25 percent of sulfur dioxide based on the weight of the monomer and 3.8 percent of sodium bicarbonate based on the weight of the monomer. After completing a dwell time of 50 minutes within the reactor whereupon a polymer comprised of 93 percent acrylonitrile and 7 percent vinyl acetate was formed, a slurry which included the polymer, the unreacted monomer, the catalyst and the activators was drawn from the reactor through a V-shaped trap where 1 percent based on the weight of the monomer of oxalic acid was added to shortstop the polymerization reaction. The slurry was then fed into the stripping column where steam flowing countercurrent thereto stripped it of its unpolymerized monomer and other volatile impurities. During the operation of the column, the steam rate was controlled to maintain a vaporhead temperature of 90° C. plus or minus 2° C. The unreacted monomer and water were condensed and fed into a decanter where the monomer and water separated into layers. The unreacted monomers were recycled and combined in the proper weight proportions with fresh monomer while the water was recycled and fed into the top of the stripping column as reflux. This water may be sewered; however, it has dissolved therin approximately 7 percent monomer based on the weight of the water and a savings results by recovering the same. The polymer and salts were removed from the bottom of the stripping column and fed to a filtration system where a filter separates the polymer from the water and salts. As has been previously pointed out, the pH of the process of the prior art is raised by adding sodium bicarbonate to the monomer recovery column feed. This prevents sulfur dioxide from promoting post polymerization by reacting therewith to form carbon dioxide and sodium bisulfite. However, in the old system the sodium bisulfite reacted with acrylonitrile at the higher pH values to form an acrylonitrile-bisulfite addition product. Since the formation of this acrylonitrile-bisulfite product is a function of the pH and the time the monomer is in contact with the sodium bisulfite, it would be an improvement to lower pH and reduce the dwell time. Table I shows the time for each step and the pH at that step for the standard process of the prior art and for the new and disclosed process. It can be seen that the disclosed process only requires three steps until the monomer is stripped and one run made by the disclosed system as to the acryminutes. The standard process requires five steps, a total of 91.5 minutes with the pH ranging as high as 5.2.

TABLE I

|  | Standard process | | Disclosed process | |
| --- | --- | --- | --- | --- |
|  | pH | Time (min.) | pH | Time (min.) |
| Reactor | 3.0 | 50 | 3.0 | 50 |
| Slurry hold | 4.3 | 20 | 3.0 | 1 |
| Filtration | 4.3 | 10 | | |
| Filtrate hold | 4.3 | 10 | | |
| Distillation column | 5.2 | 1.5 | 3.0 | 1 |
| Total | | 91.5 | | 52 |

Table II discloses a comparison of the standard system and one run made by the disclosed system as to acrylonitrile losses due to the formation of the acrylonitrile-bisulfite addition product. The percent here is of the total amount of monomer added to the system.

TABLE II

|  | Standard system | Disclosed system, Ex. 1 |
| --- | --- | --- |
| Percent AN loss in reactor | 0.51 | 0.49 |
| Percent AN loss in still or column | 2.49 | 0.36 |
| Total percent AN loss | 3.00 | 0.85 |

It can be seen that the acrylonitrile loss in the reactor under each system was approximately the same. The main saving is of course during the recovery of the unreacted monomers after the acrylonitrile has been polymerized. The reduction of acrylonitrile loss within the column amounted to 86 percent in this example and the overall system reduction amount is 71.6 percent.

Example II

The process of Example I was repeated using the same feeds but without the addition of the oxalic acid shortstop. In this example, 0.54 percent of the total acrylonitrile monomers was lost in the reactor and 0.22 perment was lost in the stripping column giving a total of only 0.76 percent of the total monomer added being lost for this system. The reduction of acrylonitrile loss in this example amounted to 91 percent and the overall reduction amounted to 74 percent.

Many modifications of this invention may be made without departing from the scope and spirit thereof. It is contemplated that variations may be made in the percentages of the compounds used without greatly altering the effectiveness of the process; therefore, the applicant does not wish to be bound by the numbers except as they appear in the claims.

We claim:
1. A process of reducing the amount of acrylonitrile monomer loss in the production of acrylonitrile containing polymers due to the formation of an acrylonitrile-bisulfite addition product in a redox catalysed polymerization system utilizing a bisulfite activator comprising the steps of:
 (a) removing by steam stripping unreacted monomers from a slurry while the slurry is cascading down a column, said slurry having a maintained pH of less than about 4 and being comprised of polymerized monomers, unreacted monomers, and water,
 (b) condensing the steam and unreacted monomers associated therewith, and
 (c) separating the monomers from the condensate.
2. A process according to claim 1 wherein the pH of the slurry is maintained at less than about 3.
3. A process of reducing the amount of acrylonitrile monomer loss in the production of acrylonitrile containing polymers due to the formation of an acrylonitrile-bisulfite addition product in a redox catalysed polymerization system utilizing a bisulfite actuator comprising the steps of:
 (a) steam stripping unreacted monomers from a slurry having a maintained pH of less than about 4 and being comprised of acrylonitrile containing polymers, unreacted monomers, and water, by passing steam counter current with the directional flow of the slurry while the slurry is cascading down a stripping column, thereby steam vaporizing the monomers,
 (b) condensing the steam and the vaporized monomers associated therewith:
 (c) collecting the condensate and unreacted monomers, and
 (d) separating the unreacting monomers from the condensate.
4. A process according to claim 3 wherein the pH of the slurry is maintained at less than about 3.
5. A process according to claim 3 wherein the remainder of the condensate is recycled to the stripping column after the monomers have been removed.
6. A process according to claim 3 wherein the unreacted monomers are recycled back to the reactor after being removed from the condensate.
7. A process of reducing the amount of acrylonitrile monomer loss in the production of acrylonitrile containing polymers due to the formation of an acrylonitrile-bisulfite addition product in a redox catalysed polymerization system utilizing a bisulfite activator comprising the steps of:
 (a) continuously introducing a slurry having a maintained pH of less than about 3 and being comprised of acrylonitrile containing polymers, unreacted monomers, and water, into the top of a monomer stripping column having baffles mounted therein,
 (b) forcing steam into the lower portions and up through the stripping column in a direction countercurrent with the flow of the slurry as the slurry and particles thereof cascades down the baffles of the stripping column, thereby steam stripping and removing unreacted monomers from the slurry by vaporizing them,
 (c) collecting the vapor being comprised of steam and unreacted monomers,
 (d) condensing the steam and monomers,
 (e) separating the monomers from the condensate,
 (f) recycling the monomers back to the reactor,
 (g) recycling the water back to the stripping column as reflux, and
 (h) filtering the slurry to remove the polymerized monomer therefrom.

References Cited

UNITED STATES PATENTS

| 2,462,013 | 2/1949 | Waterman | 203—42 |
| 2,556,851 | 6/1951 | Ohsol et al. | 260—82.3 |
| 2,807,573 | 9/1957 | Robertson | 202—39.5 |
| 3,084,143 | 4/1963 | Hieserman et al. | 260—85.5 |
| 3,153,024 | 10/1964 | Thompson et al. | 260—85.5 |
| 3,192,189 | 6/1965 | Nakajima et al. | 260—85.5 |

OTHER REFERENCES

Nagoo, Chem. Abs. 53 (1959), pp. 6691e, Chem. Abs. 55 (1961), pp. 11308c.

HARRY WONG, JR., *Primary Examiner.*

U.S. Cl. X.R.

260—88.7

UNITED STATES PATENT OFFICE
CERTIFICATE OF CORRECTION

Patent No. 3,454,542                                                  July 8, 1969

Dudley W. Cheape, Jr., et al.

It is certified that error appears in the above identified patent and that said Letters Patent are hereby corrected as shown below:

Column 4, line 50, "one run made by the disclosed system as to the acry-" should read -- at each step the pH is three and the total time is 52 --. Column 5, line 47, "actuator" should read -- activator --.

Signed and sealed this 21st day of April 1970.

(SEAL)
Attest:

Edward M. Fletcher, Jr.                              WILLIAM E. SCHUYLER, JR
Attesting Officer                                               Commissioner of Patents